(12) United States Patent
McKeever

(10) Patent No.: US 12,427,929 B2
(45) Date of Patent: Sep. 30, 2025

(54) BICYCLE MOUNT

(71) Applicant: Toyota Motor Engineering & Manufacturing North America, Inc., Plano, TX (US)

(72) Inventor: Katriena M. McKeever, Livonia, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 185 days.

(21) Appl. No.: 18/202,611

(22) Filed: May 26, 2023

(65) Prior Publication Data

US 2024/0391393 A1    Nov. 28, 2024

(51) Int. Cl.
*B60R 9/10*    (2006.01)

(52) U.S. Cl.
CPC ..................... *B60R 9/10* (2013.01)

(58) Field of Classification Search
CPC .................... B60R 9/10; B60R 9/06
See application file for complete search history.

(56) References Cited

U.S. PATENT DOCUMENTS

| | | | |
|---|---|---|---|
| 4,842,148 A | 6/1989 | Bowman | |
| 6,398,091 B1 * | 6/2002 | Munoz | B60R 9/10 |
| | | | 224/403 |
| 7,077,374 B1 | 7/2006 | Johnson | |
| 9,598,023 B2 * | 3/2017 | Kisaka | B60R 9/10 |
| 10,252,758 B2 * | 4/2019 | Lickton | B62H 3/10 |
| 11,459,048 B2 * | 10/2022 | Ardmar | B60R 9/10 |
| 11,772,728 B2 * | 10/2023 | Ardmar | B60R 9/048 |
| | | | 211/20 |
| 2006/0263163 A1 | 11/2006 | Harberts et al. | |
| 2008/0061198 A1 * | 3/2008 | Noyes | B60R 9/048 |
| | | | 29/11 |
| 2009/0266773 A1 | 10/2009 | Janeczko | |
| 2014/0367437 A1 | 12/2014 | D'Angelo | |
| 2015/0151688 A1 | 6/2015 | Back | |
| 2021/0231066 A1 * | 7/2021 | Maier | F02D 41/0025 |

FOREIGN PATENT DOCUMENTS

| | | |
|---|---|---|
| DE | 9412752 U1 | 10/1994 |
| DE | 19636977 A1 | 3/2001 |
| DE | 102011010578 A1 | 8/2012 |
| DE | 102015006464 B3 * | 5/2016 |

* cited by examiner

*Primary Examiner* — Scott T McNurlen
(74) *Attorney, Agent, or Firm* — Christopher G. Darrow; Darrow Mustafa PC

(57) ABSTRACT

Embodiments described herein relate to mounting bicycles to vehicles. In one arrangement, a bicycle mount is disclosed. The bicycle mount includes shafts forming a spatial arrangement around a central bicycle mount axis. The shafts define shaft axes, shaft lengths, and one or more bores extending axially along the shaft length. The one or more bores are sized to receive a front wheel axle of a bicycle, such that when the front wheel axle is installed to one of the bores, the bicycle is mounted to the shaft when the front wheel is removed from the bicycle. The bicycle mount also includes cross-members located between the shafts and connecting the shafts in the spatial arrangement.

10 Claims, 6 Drawing Sheets

BICYCLE MOUNT

TECHNICAL FIELD

The present disclosure relates generally to bicycles and, more particularly, to a mount for a bicycle.

BACKGROUND

Users of pickup trucks often use the bed of the pickup truck to transport large objects such as bicycles. To do so, the user may need to use cumbersome, heavy, and large devices to transport the bicycle in the bed. Moreover, if the user has multiple bicycles of different sizes or other characteristics, the user may need separate devices for each bicycle. Accordingly, securing cargo, such as bicycles, can be difficult, resulting in the user spending more time and effort to secure cargo.

SUMMARY

The present disclosure describes, in various arrangements, a bicycle mount for mounting a bicycle to a mounting surface, for example, a bed of a vehicle, such as a pickup truck. The bicycle mount is removable from the vehicle, is lightweight, portable, and easy to use. The bicycle mount includes shafts that the user can connect the bicycle to using the front wheel axle of the bicycle when the front wheel is removed. The shafts have different sized holes so that the bicycle mount is compatible with bicycles having different front wheel axle sizes, for example, road bicycles, mountain bicycles, etc. Moreover, the bicycle mount can be installed to a vehicle using a poka-yoke system that is easy for a user to use. The poka-yoke system includes pins connected to the bicycle mount and holes in the mounting surface having a shape corresponding to the pins. The pins are configured to mount the bicycle mount to the mounting surface when inserted into the holes. When the bicycle mount is not in use, the bicycle mount is easily removable from the vehicle and is compact for storage elsewhere in or outside of the vehicle. In this way, the bicycle mount resolves the need for multiple devices to secure multiple types of bicycles as well as the need for heavy and/or bulky equipment to improve the mounting of bicycles to vehicles.

In one embodiment, a bicycle mount is disclosed. The bicycle mount includes shafts forming a spatial arrangement around a central bicycle mount axis. The shafts define shaft axes, shaft lengths, and one or more bores extending axially along the shaft length, the one or more bores sized to receive a front wheel axle of a bicycle, such that when the front wheel axle is installed to one of the bores of one of the shafts, the bicycle is mounted to the one of the shafts when the front wheel is removed from the bicycle. The bicycle mount also includes cross-members located between the shafts and connecting the shafts in the spatial arrangement.

Further areas of applicability and various methods of enhancing the above technology will become apparent from the description provided herein. The description and specific examples in this summary are intended for purposes of illustration only and are not intended to limit the scope of the present disclosure.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

The present disclosure describes, in various arrangements, a bicycle mount for mounting a bicycle to a bed of a pickup truck, for example. The bicycle mount is removable from the vehicle, is lightweight, portable, and easy to use. The bicycle mount includes shafts that the user can connect the bicycle to using the front wheel axle of the bicycle when the front wheel is removed. The bicycle mount can be used with bicycles having different front wheel axle sizes, for example, road bicycles, mountain bicycles, etc. To facilitate to use with different types of bicycles, the shafts include holes having different diameters corresponding to different front wheel axles sizes. Moreover, the bicycle mount can be installed to a vehicle using a poka-yoke system that is easy for a user to use. The poka-yoke system includes pins connected to the bicycle mount and holes in a floor of the bed of the truck having a shape corresponding to the pins. When the pins are inserted into the holes, the bicycle mount is attached to the bed. When the bicycle mount is not in use, the bicycle mount is easily removable from the vehicle and is compact for storage elsewhere in or outside of the vehicle. In this way, the bicycle mount improves over current devices for attaching bicycles to pickup trucks, because the bicycle mount is portable, easy to use, and compatible with various types of bicycles.

Figure 1A:
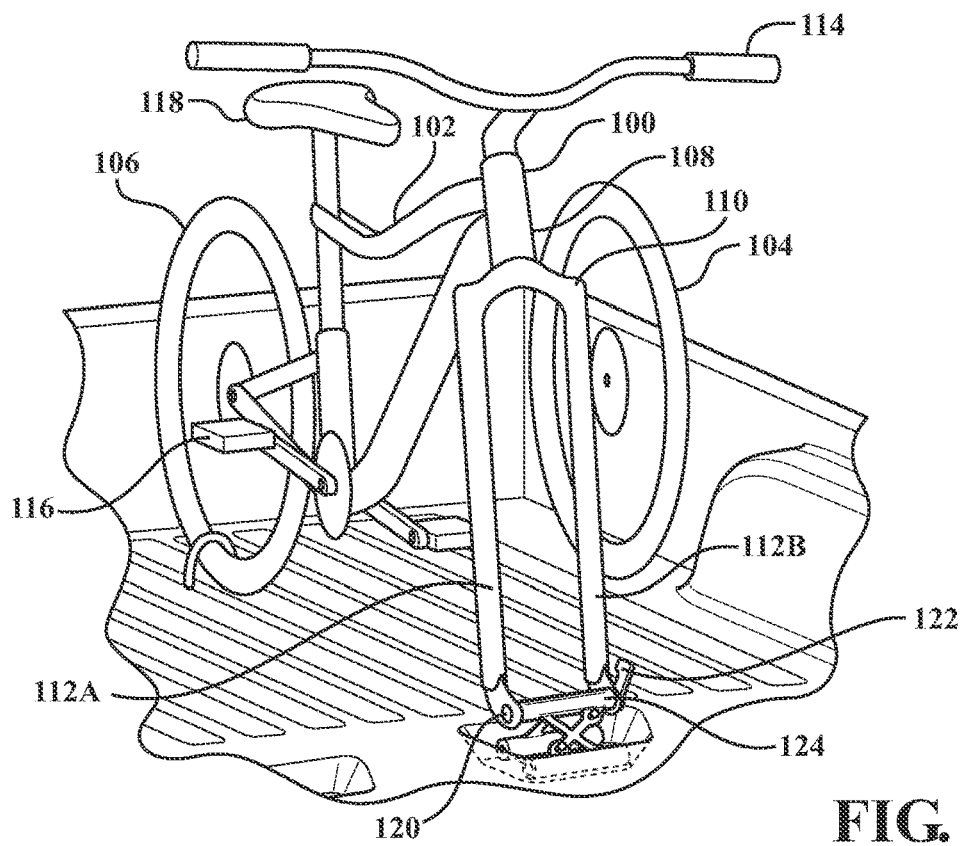
FIG. 1A shows an example of a bicycle mounted to cavity of a bed of a pickup truck using a bicycle mount.

Referring now to FIG. 1A, an example of a bicycle 100 is shown. As shown, the bicycle 100 is mounted to a vehicle. The vehicle, which as shown is a pickup truck, is described in further detail below. As shown, the bicycle 100 is a mountain bicycle, however, the bicycle 100 can be another type of bicycle such as a road bicycle, a tricycle, etc. In some instances, the bicycle 100 is entirely manually operated, however, in other instances, the bicycle 100 is an electric bicycle or a motorized bicycle. Among other components of the bicycle 100, the bicycle 100 includes a frame 102, a front wheel 104, a rear wheel 106, a front steering axle 108, a front fork assembly 110 having front forks 112 (e.g., a first front fork 112A and a second front fork 112B), a handlebar assembly 114, a pedal assembly 116, and a saddle 118. The frame 102 is connected to the front wheel 104, the rear wheel 106, front steering axle 108, the front fork assembly 110, the handlebar assembly 114, the saddle 118, and the pedal assembly 116. The front steering axle 108 is connected to the front fork assembly 110 and the handlebar assembly 114, and the front fork assembly 110 is connected to the front wheel 104. Rotation of the handlebar assembly 114 by the rider causes rotation of the front steering axle 108, which causes the front fork assembly 110 to rotate. Rotation of the front fork assembly 110 causes rotation of the front wheel 104. In this way, the rider can steer the bicycle 100. The pedal assembly 116 is connected to the rear wheel 106, and rotation of the pedal assembly 116 causes rotation of the rear wheel 106 to propel the bicycle 100 along the ground. The frame 102 is also connected to the saddle 118, which is a seat that supports a rider of the bicycle 100.

Figure 1B:
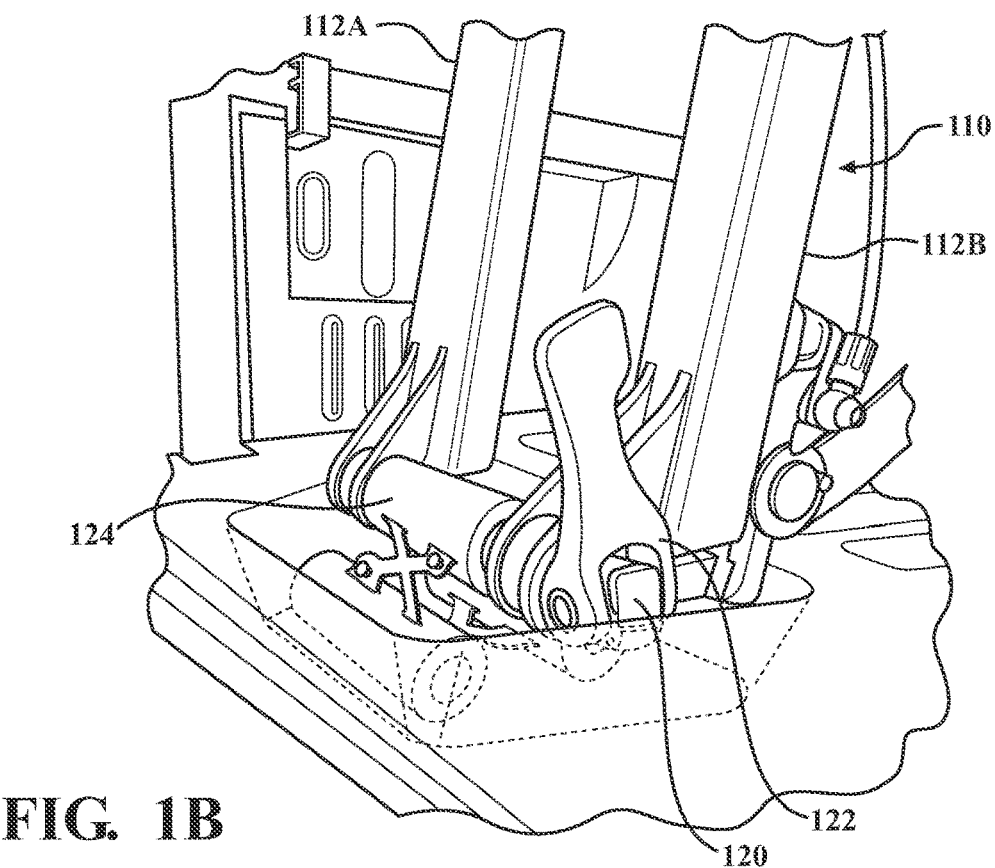
FIG. 1B shows a close-up view of the bicycle mounted in the bed using the bicycle mount.

In addition to the above-described components, the bicycle 100 also includes a front wheel axle 120. The front wheel axle 120 connects the front wheel 104 to the front fork assembly 110. The front wheel axle 120 is removable from the front wheel 104 and the front fork assembly 110 and includes, in the illustrated example, a quick-release mechanism 122 for attaching the front wheel 104 to the front fork assembly 110 and for removing the front wheel 104 from the front fork assembly 110. As will be described in further detail below, a user of the bicycle 100 can mount the bicycle 100 to a vehicle for storage and transportation of the bicycle 100 when the front wheel 104 is removed from the front fork assembly 110. The bicycle 100 is configured to be mounted to the vehicle using a bicycle mount 124. FIG. 1B shows a close-up view of a portion of the bicycle 100 of FIG. 1A, showing the front wheel axle 120, a portion of the front fork assembly 110, and the bicycle mount 124 in greater detail. As described in further detail below, the bicycle 100 is configured to be mounted to the bicycle mount 124 by the front wheel axle 120 and the front fork assembly 110. When the bicycle 100 is mounted to the vehicle, the front wheel 104 can be stored elsewhere in the vehicle, as described in further detail below.

Figure 2A:
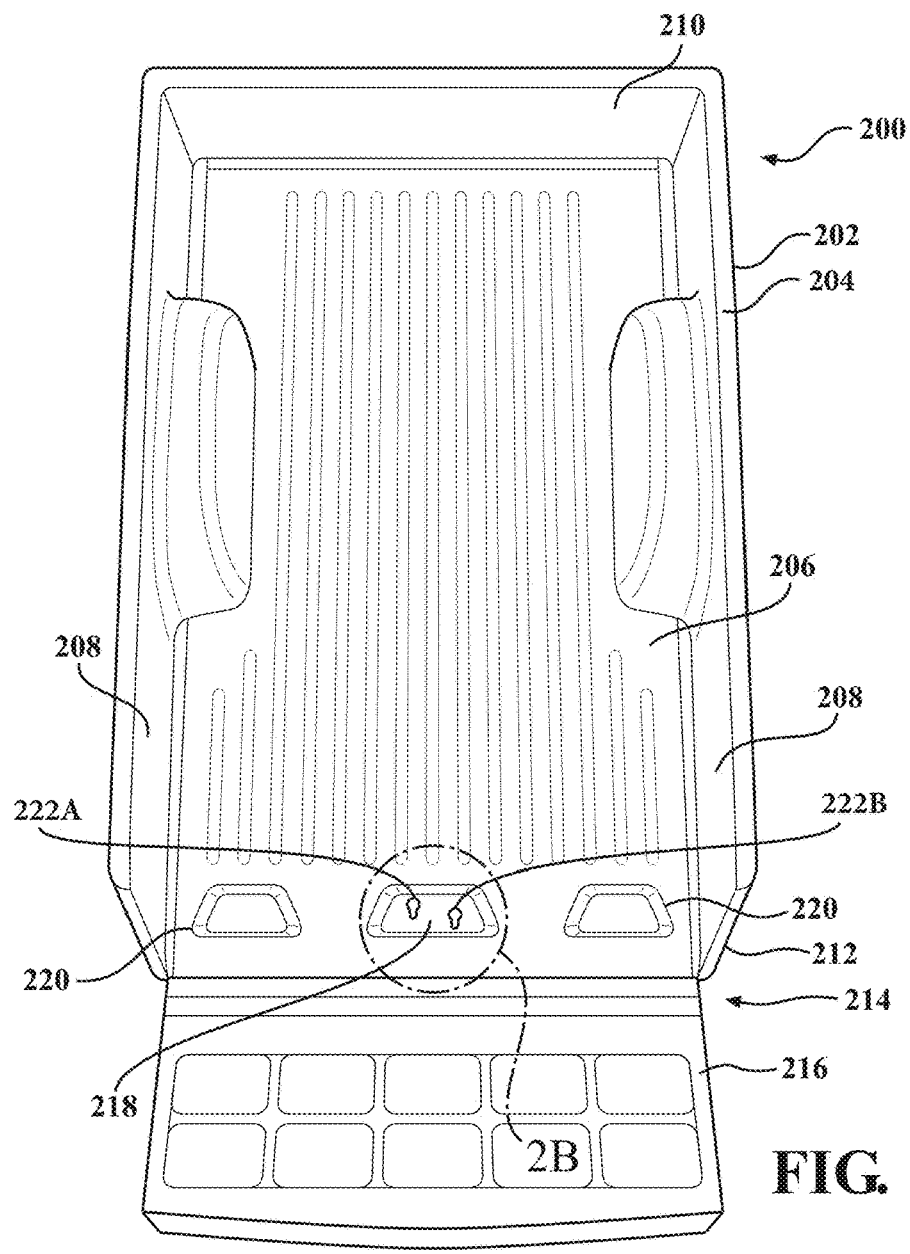
FIG. 2A shows a first example of a top-down view of the bed having holes for mounting the bicycle mount to the bed, where the holes are located in the cavity.

With additional reference to FIG. 2A, a portion of a vehicle 200 is illustrated. As described in further detail below, the bicycle 100 is mounted to the vehicle 200. In one or more arrangements, for example, as shown, the vehicle 200 is a pickup truck, however, in one or more other arrangements, the vehicle 200 is another type of vehicle with a flat storage space, such as a semi-truck, a flatbed trailer, etc. The vehicle 200 includes an exterior and a number of interior compartments and a body 202 that forms the exterior and defines or otherwise encloses the compartments. The compartments include a passenger compartment, an engine compartment, and, in the illustrated pickup truck configuration of the vehicle 200, an open-topped bed 204 for carrying cargo. The body 202 of the vehicle 200 defines the bed 204. In relation to the bed 204, the body 202 includes a bed floor 206, sides 208, a bulkhead 210, and a rear end 212. At the rear end 212, the body 202 defines a tailgate opening 214. Similarly to other openings that open between the compartments and the exterior, the tailgate opening 214 opens between the bed 204 and the exterior. Relatedly, as part of the rear end 212, the body 202 includes a tailgate 216 corresponding to the tailgate opening 214. Similarly to other closure panels that correspond to other openings, the tailgate 216 is pivotally connected to the remainder of the body 202 for movement, relative to the tailgate opening 214, between a closed position over the tailgate opening 214 and an open position away from the tailgate opening 214.

Figure 4A:
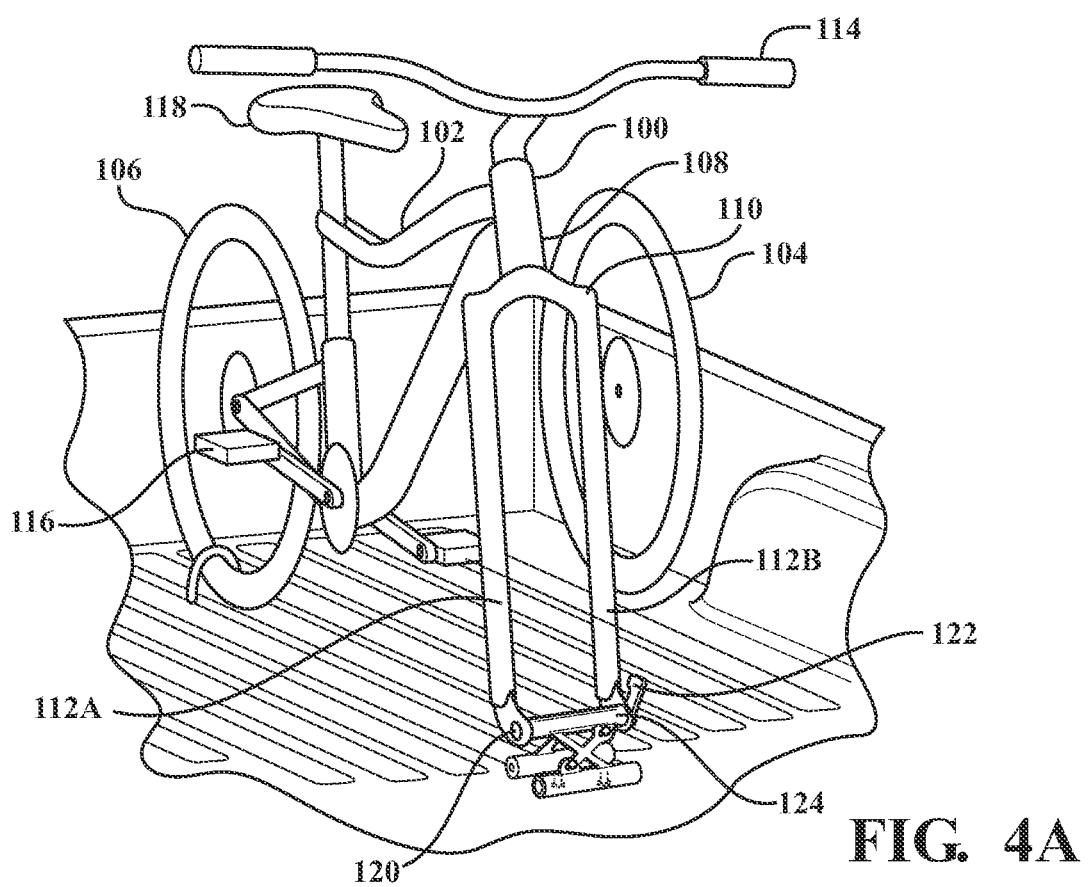
FIG. 4A shows an example of a bicycle mounted directly to the bed of the pickup truck using the bicycle mount.
Figure 4B:
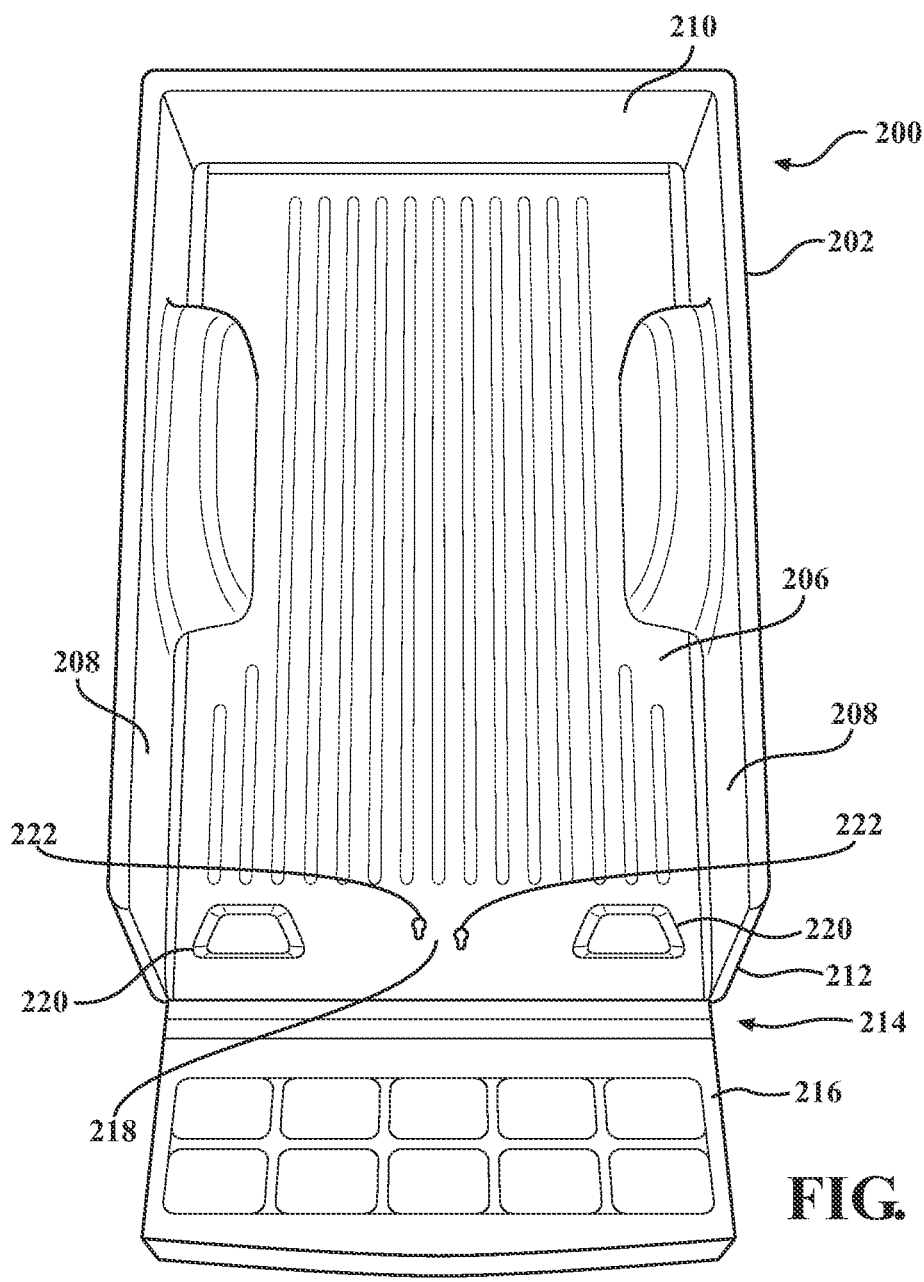
FIG. 4B shows a second example of a top-down view of the bed, where the holes are located directly on the bed.

As mentioned above, in one or more arrangements, the bicycle 100 is mounted to the vehicle 200. More specifically, as shown, the bicycle 100 is mounted to the bed 204 using the bicycle mount 124. The bicycle mount 124 is configured to be mounted to a mounting surface 218 of the vehicle 200. As described herein, in one or more arrangements, the mounting surface 218 is located in a cavity 220 of the bed 204. In one or more other arrangements, the mounting surface 218 is the bed 204 itself. In arrangements in which the vehicle 200 is another type of vehicle 200, the mounting surface 218 is a suitable flat surface of the vehicle 200. As described in further detail below, the mounting surface 218 includes holes 222 for mounting the bicycle mount 124 to the vehicle 200. In the arrangement shown, the holes 222 include a first hole 222A and a second hole 222B, however, the holes 222 can include another suitable number of holes 222. In one or more arrangements, for example, as described herein, the holes 222 are located on the bed 204. In one or more other arrangements, the holes 222 are located in one or more cavities 228 of the bed 204. In one or more instances, the cavities 220 are sized and shaped to house the bicycle mount 124, as described in further detail below in connection with FIG. 2B. In one or more other arrangements, the holes 222 are located on a suitable surface of the vehicle 200. For example, as shown in FIG. 4A-4B, the holes 222 are located on the bed 204 of the vehicle 200, and the bicycle 100 is mounted directly to the bed 204. These features will be described in further detail below.

Figure 3A:
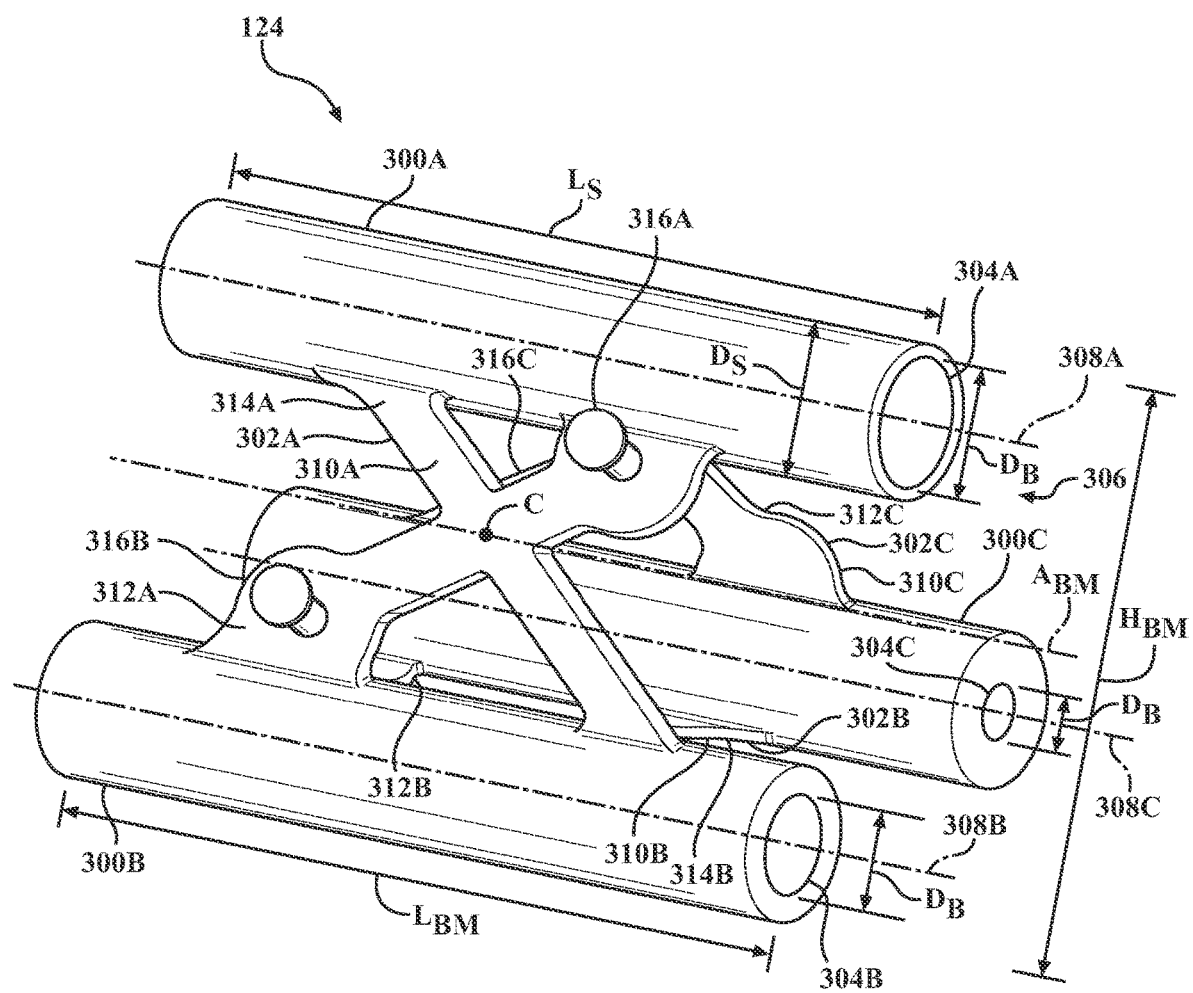
FIG. 3A shows an example of the bicycle mount.
Figure 3B:
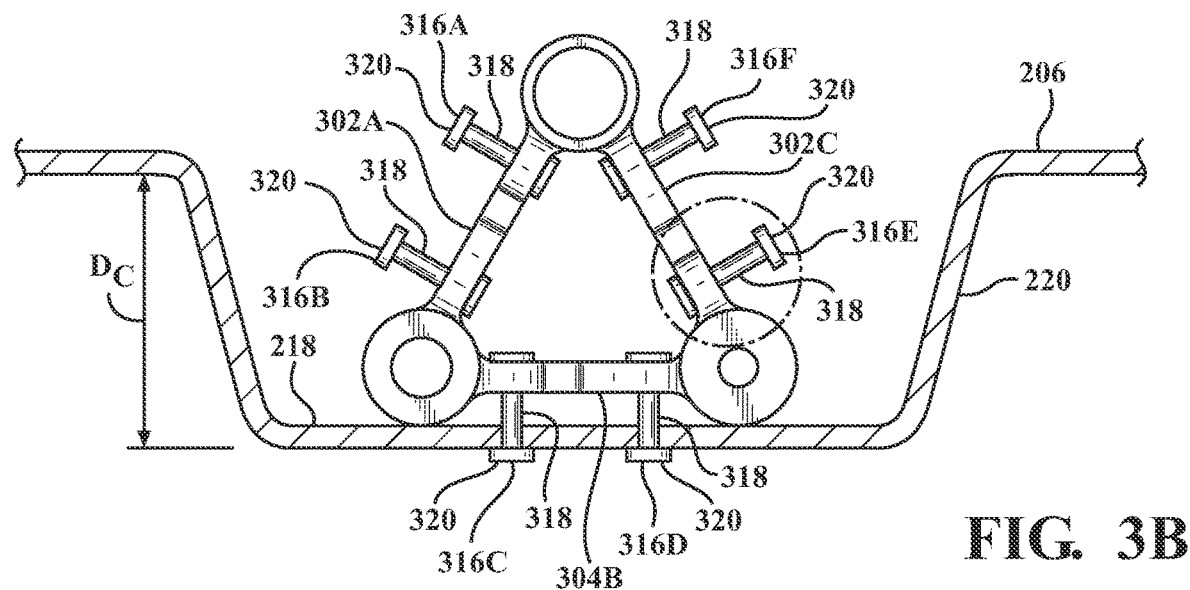
FIG. 3B shows a cross-sectional view of the bicycle mount.

As mentioned above, the bicycle 100 is mounted to the vehicle 200 using a bicycle mount 124. Referring now to FIGS. 3A and 3B, an example of the bicycle mount 124 is illustrated. The bicycle mount 124 includes shafts 300 and cross-members 302. As described in further detail below, in one or more arrangements, the bicycle mount 124 includes three shafts 300 (a first shaft 300A, a second shaft 300B, and a third shaft 300C) and three cross-members 302 (a first cross-member 302A, a second cross-member 302B, and a third cross-member 302C). The cross-members 302 are located between the shafts 300 and connect the shafts 300 to each other. The shafts 300 define one or more bores 304 sized to receive the front wheel axle 120 of the bicycle 100 such that when the front wheel axle 120 is installed to one of the bores 304 of one of the shafts 300, the bicycle 100 is mounted to that shaft 300 when the front wheel 104 is removed from the bicycle 100. In one or more arrangements, the bores 304 have different sizes to allow a user to use the bicycle mount 124 with different bicycles having various front wheel axle sizes. As described in further detail below, in one or more arrangements, the shafts 300 define three bores 304 (the first shaft 300A defines a first bore 304A, the second shaft 300B defines a second bore 304B, and the third shaft 300C defines a third bore 304C).

The bicycle mount 124 defines a bicycle mount length LBM and a bicycle mount height HBM. The bicycle mount 124 also defines a central bicycle mount axis $A_{BM}$. The bicycle mount axis $A_{BM}$ extends lengthwise through the bicycle mount 124 substantially centrally within the bicycle mount 124. The shafts 300 form a spatial arrangement 306 around the bicycle mount axis $A_{BM}$. The spatial arrangement 306 is an arrangement in which the shafts 300 are located at a distance from the bicycle mount axis $A_{BM}$. The spatial arrangement 306 allows the user to rotate the bicycle mount 124 to utilize the bore 304 that matches the user's front wheel axle size. Various examples of the spatial arrangement 306 will be described in further detail below.

The shafts 300 define shaft axes 308. Shaft axes 308 extends lengthwise along the shafts 300 substantially centrally within each shaft 300. In the example shown, the first shaft 300A defines a first shaft axis 308A, the second shaft 300B defines a second shaft axis 308B, and the third shaft 300C defines a third shaft axis 308C. The shafts 300 also define shaft lengths $L_S$. In one or more arrangements, the shafts 300 define substantially equal shaft lengths $L_S$. In one or more arrangements, the shafts 300 define different lengths $L_S$. In one or more instances, the shaft length(s) $L_S$ are substantially equal to or less than the distance between the front forks 112 of the bicycle 100. In one or more other instances, the shaft length(s) $L_S$ are substantially equal to or less than the length of the front wheel axle 120. In other instances, the shaft length(s) $L_S$ are another suitable length.

The shafts 300 also define shaft diameters $D_S$. In one or more arrangements, the shafts 300 define substantially equal shaft diameters $D_S$. In one or more arrangements, the shafts 300 define unequal shaft diameters $D_S$. The shaft diameters $D_S$ have a suitable dimension. Each of the shafts 300 also defines a shaft cross-sectional shape. As shown, the shafts 300 define substantially circular shaft cross-sectional shapes. In other words, the shafts 300 have substantially cylindrical shapes. The cylindrical shape provides the benefit of a smooth surface that does not have any sharp edges or corners that may damage the bicycle 100 and/or the vehicle 200 in which the bicycle 100 is mounted. However, in other arrangements, the shafts 300 define shaft cross-sectional shapes having other shapes, for example, substantially square shapes, substantially rectangular shapes, substantially triangular shapes, etc. In one or more arrangements, each of the shafts 300 have substantially similar shaft cross-sectional shapes. For example, as shown, each of the shafts 300 have substantially circular shaft cross-sectional shapes. However, in one or more other arrangements, the shafts 300 define different shaft cross-sectional shapes. For example, in one instance, the bicycle mount 124 includes two shafts 300 defining substantially circular shaft cross-sectional shapes and one shaft defining a substantially square shaft cross-sectional shape.

As mentioned above, the shafts 300 define one or more bores 304. In one or more arrangements, for example, as shown, each of the shafts 300 defines a bore 304. In the example shown, the bicycle mount 124 defines three bores 304 corresponding to the three shafts 300. More specifically, the first shaft 300A defines the first bore 304A, the second shaft 300B defines the second bore 304B, and the third shaft 300C defines the third bore 304C. In one or more other arrangements, the shafts 300 define one bore 304 corresponding to one of the shafts 300. For example, the first shaft 300A can define the first bore 304A while the other shafts 300 do not define bores 304. In still one or more other arrangements, the shafts 300 define a suitable number of bores 304. For example, in arrangements in which the bicycle mount 124 includes four shafts 300, the shafts 300 may define one, two, three, or four bores 304. In another example, in arrangements in which the bicycle mount 124 includes five shafts 300, the shafts 300 may define one, two, three, four, or five bores 304. Other arrangements may be suitable as well.

In one or more instances, the bores 304 extend along the shaft axes 308 for the entire shaft lengths $L_S$. Accordingly, the bores 304 cause the shafts 300 to be hollow. The bores 304 also have bore cross-sectional shapes. In one or more arrangements, the bores 304 have substantially similar bore cross-sectional shapes. For example, as shown, the bores 304 each have a substantially circular bore cross-sectional shape corresponding to a cylindrical front wheel axle 120. However, in other arrangements, the bores 304 may have different bore cross-sectional shapes. For example, one or more of the bores 304 may have substantially square, triangular, or other bore cross-sectional shapes corresponding to differently-shaped front wheel axles 120.

The bores 304 also define bore diameters DB. In one or more arrangements, the bore diameters DB are substantially equal. In one or more other arrangements, for example, as shown, two or more of the bores 304 define unequal bore diameters DB. In arrangements in which two or more of the bores 304 define unequal diameters DB, each bore diameter DB may correspond to a different front wheel axle 120 size. This allows the user to choose the size that corresponds to their front wheel axle 120 size, and also allows the bicycle mount 124 to be used with many different bicycles that have different front wheel axle 120 sizes. For example, common diameters for mountain bicycle axles include 9 millimeters (mm), 15 mm, and 20 mm. Accordingly, in the example shown, the bore diameter DB of the first bore 304A is about 20 mm, the diameter DB of the second bore 304B is about 15 mm, and the diameter DB of the third bore 304C is about 9 mm. However, the bore(s) 304 can define bore diameters DB of other suitable dimensions.

As mentioned above, the bicycle mount 124 includes cross-members 302 (the first cross-member 302A, the second cross-member 302B, and the third cross-member 302C). The first cross-member 302A connects the first shaft 300A to the second shaft 300B, the second cross-member 302B connects the second shaft 300B to the third shaft 300C, and the third cross-member 302C connects the third shaft 300C to the first shaft 300A. In other arrangements in which the bicycle mount 124 includes more than three shafts 300, the bicycle mount 124 also includes a suitable, corresponding number of cross-members 302. For example, in arrangements in which the bicycle mount 124 includes four shafts 300, the bicycle mount 124 includes four cross-members 302, and in arrangements in which the bicycle mount 124 includes five shafts 300, the bicycle mount 124 includes five cross-members 302, and so on. Moreover, the cross-members 302 define cross-member surfaces 310. For example, the first cross-member 302A includes a first cross-member surface 310A, the second cross-member 302B includes a second cross-member surface 310B, and the third cross-member 302C includes a third cross-member surface 310C.

When the shafts 300 are connected by the cross-members 302 in the spatial arrangement 306, the bicycle mount 124 defines a mount cross-sectional shape. In the arrangement shown, the cross-members 302 connect the shafts 300 in a spatial arrangement 306 having a substantially triangular mount cross-sectional shape. As shown, the substantially triangular mount cross-sectional shape has the shape of a substantially equilateral triangle. A substantially equilateral triangular mount cross-sectional shape may provide an even weight distribution across the bicycle mount 124. Moreover, the shafts 300 resting on the mounting surface 218 provide support for the shaft 300 in use. Additionally, the symmetric shape of the substantially equilateral triangular mount cross-sectional shape permits quick adjustment by the user to accommodate other front wheel axle sizes by simple rotation of the bicycle mount 124 and remounting of the bicycle mount 124 to the mounting surface 218. However, in one or more other arrangements, the substantially triangular mount cross-sectional shape may have substantially the shape of another suitable type of triangle, for example, an isosceles triangle, a scalene triangle, an obtuse triangle, an acute triangle, or a right triangle.

In one or more other arrangements in which the bicycle mount 124 includes more than three shafts 300, the cross-members 302 connect the shafts 300 in a spatial arrangement 306 having a mount cross-sectional shape of another suitable shape. For example, in one or more arrangements in which the bicycle mount 124 includes four shafts 300, the cross-members 302 may connect the shafts 300 in a spatial arrangement 306 having a substantially square mount cross-sectional shape. In another example, in arrangements in which the bicycle mount 124 includes five shafts 300, the cross-members 302 may connect the shafts 300 in a spatial arrangement 306 having a substantially pentagonal mount cross-sectional shape. Other shapes may be suitable in these and other arrangements. Moreover, as shown, the shafts 300 are spaced equidistant from the bicycle mount axis $A_{BM}$, however, in other arrangements, two or more of the shafts 300 are spaced unequally from the bicycle mount axis $A_{BM}$.

In one or more arrangements, for example, as shown, the cross-members 302 are substantially X-shaped. More specifically, in one or more instances, the cross-members 302 include major trusses 312 and minor trusses 314 arranged in pairs each forming an X-shape. For example, the first cross-member 302A includes a first major truss 312A and a first minor truss 314A, the second cross-member 302B includes a second major truss 312B and a second minor truss 314B, and the third cross-member 302C includes a third major truss 312C and a third minor truss 314C. The X-shape may provide the cross-members 302 with a high strength, good aesthetic appearance, low weight, shear resistance, and/or easy manufacturability. However, the cross-members 302 can have other shapes suitable for connecting the shafts 300. For example, the cross-members 302 can be substantially H-shaped, substantially I-shaped, substantially N-shaped, etc. In one or more instances, for example, as shown, each of the cross-members 302 have substantially similar shapes. However, in one or more other instances, two or more of the cross-members 302 have different shapes.

Figure 3C:
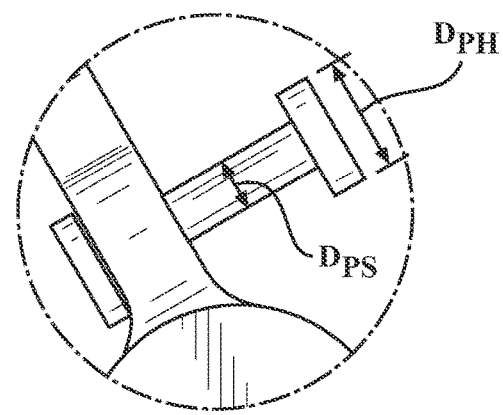
FIG. 3C shows a close-up view of a pin of the bicycle mount.

With continued reference to FIGS. 3A-3C, the bicycle mount 124 also includes pins 316. The pins 316 are used to mount the bicycle mount 124 to the vehicle 200, for example, to the bed 204 of the pickup truck. The pins 316 are connected to the cross-members 302 and extend substantially perpendicularly from the cross-member surfaces 310. In one or more arrangements, as shown, each cross-member includes two pins 316. More specifically, the first cross-member 302A includes a first pin 316A and a second pin 316B extending from the first cross-member surface 310A, the second cross-member 302B includes a third pin 316C and a fourth pin 316D extending from the second cross-member surface 310B, and the third cross-member 302C includes a fifth pin 316E and a sixth pin 316F extending from the third cross-member surface 310C. However, in one or more other arrangements, each cross-member 302 includes three or more pins 316.

In arrangements in which each cross-member 302 includes two pins 316, the first pins 316 are offset from each other. For example, referring to the first cross-member 302A, in one or more arrangements, the first pin 316A and the second pin 316B are located on the first major truss 312A of the first cross-member 302A at opposite ends of the major truss 312A. Accordingly, in one or more arrangements, the first pin 316A and the second pin 316B are offset from each other with respect to a center C of the first cross-member 302A both in a direction along the bicycle mount length LBM and in a direction along the bicycle mount height HBM. The first pin 316A and the second pin 316B are offset from each other as a part of the poka-yoke system to ensure that the user attaches the bicycle mount 124 to the mounting surface 218 correctly. More specifically, the offset arrangement of the first pin 316A and the second pin 316B provides a one-way fit so that the bicycle mount 124 can be easily installed to the mounting surface 218 in such a manner that it is automatically oriented correctly for use. Moreover, in one or more instances, the arrangement of the pins 316 on each of the cross-members 302 may be different for two or more of the cross-members 302. More specifically, in one or more instances, for example, as shown in FIG. 3A, the first major truss 312A and the first minor truss 314A are oriented oppositely between the first cross-member 302A and the second cross-member 302B.

In one or more arrangements, referring now to FIGS. 3B and 3C, one or more of the pins 316 define pin shafts 318 and pin heads 320. The pin shafts 318 define pin shaft diameters $D_{PS}$, and the pin heads define pin head diameters $D_{PH}$. In one or more arrangements, for example, as shown, the pin shaft diameters $D_{PS}$ are smaller than the pin head diameters $D_{PH}$. As mentioned above, the bicycle mount 124 is configured to be mounted to a mounting surface 218 defining holes 222. The pin shafts 318 and pin heads 320 correspond to the holes 222 of the mounting surface 218.

Figure 2B:
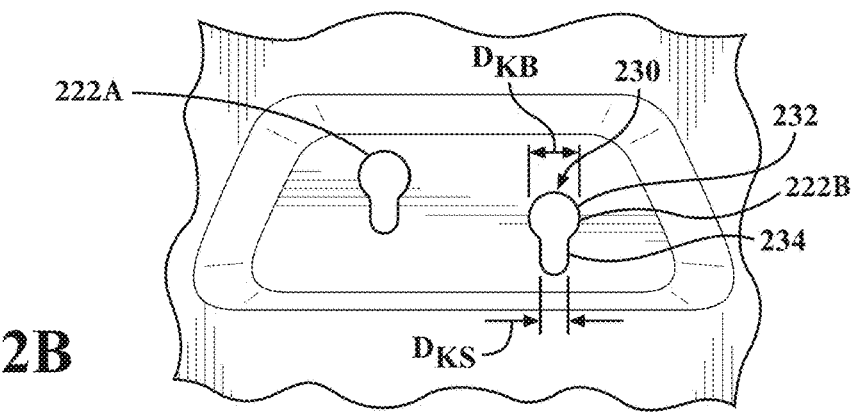
FIG. 2B shows a close-up view of the holes of the bed.

With additional reference now to FIG. 2B, and as also shown in FIG. 4B, the mounting surface 218 defines holes 222 having a keyhole shape 230. More specifically, in one or more arrangements, the keyhole shape 230 has a keyhole body 232 and a keyhole slot 234. The keyhole body 232 defines a keyhole body diameter $D_{KB}$ and is shaped to receive the pin head 320, and the keyhole slot 234 defines a keyhole slot diameter DKs and is shaped to receive the pin shaft 318. Accordingly, in one or more arrangements, the pin head diameter $D_{PH\ S}$ substantially equal to or less than the keyhole body diameter $D_{KB}$, and the pin shaft diameter $D_{PS}$ is substantially equal to or less than the keyhole slot diameter DKs. Therefore, when the user mounts the bicycle mount 124 to the mounting surface 218, the user inserts the pins 316 into the holes 222, sliding the pin shafts 318 into the keyhole slots 234 to lock the bicycle mount 124 to the mounting surface 218. Moreover, in combination with the shape of the pins 316 and the holes 222, and the varying orientations of the major trusses 312 and the minor trusses 314 of the cross-members 302, the offset arrangement of the pins 316 and the holes 222 creates a poka-yoke (i.e., "mistake-proofed") system for mounting the bicycle mount 124 to the mounting surface 218. The poka-yoke system ensures that the user correctly mounts the bicycle mount 124 to the mounting surface 218. While the pins 316 are described herein as having pin shafts 318 and pin heads 320 shaped for insertion to holes 222 having a keyhole shape 230, it will be understood that the pins 316 and the holes 222 can have other suitable shapes suitable for mounting the bicycle mount 124 to the mounting surface 218.

Referring back to FIG. 3A, in one or more arrangements, as mentioned above, the bicycle mount 124 is configured to be mounted within a cavity 220 of a bed 204 of a pickup truck. In such arrangements, the cavity 220 defines a cavity depth Dc, and the bicycle mount 124 height is related to the cavity depth Dc. More specifically, in one or more arrangements, the bicycle mount 124 height is slightly greater than the cavity depth Dc. As used herein, "slightly greater" means that the shaft 300 that is to be used to mount the bicycle 100 to the bicycle mount 124 rests just above the cavity 220 such that the shaft 300 is substantially flush with the bed 204. Accordingly, when the bicycle 100 is mounted to the bicycle mount 124, the bicycle mount 124 maintains the bicycle 100 substantially level to the bed floor 206. In other arrangements in which the mounting surface 218 is the bed 204 itself, for example, as shown in FIG. 4A, the bicycle 100 is mounted to the vehicle 200 non-level to the bed floor 206 when the bicycle 100 is mounted to the bicycle mount 124.

When the bicycle 100 is mounted to the bicycle mount 124, the user can store the front wheel 104 elsewhere in or on the vehicle 200. For example, in arrangements in which the vehicle 200 is a pickup truck, the user can store the front wheel 104 in the bed 204, in the passenger compartment, or anywhere else in or on the pickup truck. In other arrangements, the user can store the front wheel 104 in a trunk of the vehicle 200, on a roof of the vehicle 200, etc. Moreover, in the arrangements described herein, the bicycle 100 is mounted to the bicycle mount 124 by connecting the front fork assembly 110 to the bicycle mount 124 using the front wheel axle 120. However, in other arrangements, the bicycle 100 may include a rear fork assembly (shown in FIG. 1A) (also called a rear triangle or a rear suspension system), and the bicycle 100 can be mounted to the bicycle mount 124 by connecting the rear fork assembly to the bicycle mount 124 using the rear wheel axle. In such instances, the user can store the rear wheel 106 in any of the aforementioned locations in which the user would otherwise store the front wheel 104.

According to the arrangements described herein, the bicycle mount 124 is fully removable from the vehicle 200 and can be stored elsewhere in the vehicle 200 or outside of the vehicle 200 when not in use. For example, the bicycle mount 124 can be stored in the passenger compartment of the pickup truck when not in use. In another example, the bicycle mount 124 can be stored in the cavity 220 of the bed 204. In still other examples, the bicycle mount 124 can be stored in a luggage compartment of the vehicle 200, in a roof storage system of the vehicle 200, etc.

In one or more arrangements, the bicycle mount 124 is formed from a hard, durable material such as steel. For lightweighting, the bicycle mount 124 can be formed from aluminum. The bicycle mount 124 can be formed from other suitable materials, such as plastic. In one or more arrangements, the shafts 300, the cross-members 302, and the pins 316 are made of the same material, however, in other arrangements, the shafts 300, the cross-members 302, and/or the pins 316 are made of different materials. In one or more arrangements, the shafts 300, the cross-members 302, and the pins 316 can be unitarily formed, for example, by machining, casting, extrusion, injection molding, 3D printing, etc. However, in one or more other arrangements, the shafts 300, the cross-members 302, and the pins 316 can be formed as separate components that are later attached together, for example, through welding, gluing, fastening, etc.

The variations described herein have the advantage of providing a lightweight, portable, easy to use, multi-use bicycle mount for mounting a bicycle to a vehicle. The bicycle mount does not require permanent modifications to the bicycle or additional components fixed to the vehicle such as jigs, racks, or other aftermarket accessories. The bicycle mount allows the user to use the bicycle mount with various types of bicycles without the need for multiple, different mounts for each bicycle. Moreover, the bicycle mount is fully removable from the vehicle and not a permanent fixture on the vehicle.

The preceding description is merely illustrative in nature and is in no way intended to limit the disclosure, its application, or uses. Work of the presently named inventors, to the extent it may be described in the background section, as well as aspects of the description that may not otherwise qualify as prior art at the time of filing, are neither expressly nor impliedly admitted as prior art against the present technology.

As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

As used herein the term "about" when related to numerical values herein refers to known commercial and/or experimental measurement variations or tolerances for the referenced quantity. In some variations, such known commercial and/or experimental measurement tolerances are +/−10% of the measured value, while in other variations such known commercial and/or experimental measurement tolerances are +/−5% of the measured value, while in still other variations such known commercial and/or experimental measurement tolerances are +/−2.5% of the measured value. And in at least one variation, such known commercial and/or experimental measurement tolerances are +/−1% of the measured value.

The term "substantially" and/or "about," as used herein, include exactly the term it modifies and slight variations therefrom. Thus, the term "substantially parallel" means exactly parallel and slight variations therefrom. "Slight variations therefrom" can include within 15 degrees/percent/units or less, within 14 degrees/percent/units or less, within 13 degrees/percent/units or less, within 12 degrees/percent/units or less, within 11 degrees/percent/units or less, within 10 degrees/percent/units or less, within 9 degrees/percent/units or less, within 8 degrees/percent/units or less, within 7 degrees/percent/units or less, within 6 degrees/percent/units or less, within 5 degrees/percent/units or less, within 4 degrees/percent/units or less, within 3 degrees/percent/units or less, within 2 degrees/percent/units or less, or within 1 degrees/percent/units or less. In some examples, "substantially" can include being within normal manufacturing tolerances.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that a form or variation can or may comprise certain elements or features does not exclude other forms or variations of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one variation, or various variations, means that a particular feature, structure, or characteristic described in connection with a form, a variation, or a particular system is included in at least one variation or form. The appearances of the phrase "in one variation" (or variations thereof) are not necessarily referring to the same variation or form. It should also be understood that the various method steps discussed herein do not have to be carried out in the same order as depicted, and not each method step is required in each variation or form.

The foregoing description of the forms and variations has been provided for purposes of illustration and description. It is not intended to be exhaustive or to limit the disclosure. Individual elements or features of a particular form or variation are generally not limited to that particular form or variation, but, where applicable, are interchangeable and can be used in a selected form or variation, even if not specifically shown or described. The same may also be varied in many ways. Such variations should not be regarded as a departure from the disclosure, and all such modifications are intended to be included within the scope of the disclosure.

What is claimed is:

1. A bicycle mount, comprising:
   shafts forming a spatial arrangement around a central bicycle mount axis, the shafts defining shaft axes, shaft lengths, and one or more bores extending axially along the shaft length, the one or more bores sized to receive a front wheel axle of a front wheel of a bicycle, such that when the front wheel axle is installed to one of the bores of one of the shafts, the bicycle is mounted to the one of the shafts when the front wheel is removed from the bicycle;
   cross-members located between the shafts and connecting the shafts in the spatial arrangement; and
   pins extending substantially perpendicular from and offset on a surface of the cross-members, wherein the pins mount the bicycle mount to a mounting surface defining holes corresponding to a location of the pins on the cross-members.

2. The bicycle mount of claim 1, wherein the shafts include three shafts, wherein the cross-members include three cross-members, and wherein the spatial arrangement around the central bicycle mount axis defines a substantially triangular cross-sectional shape.

3. The bicycle mount of claim 1, wherein the one or more bores include three bores defining diameters of different sizes to receive front wheel axles of bicycles having different front wheel axle sizes.

4. The bicycle mount of claim 1, wherein the cross-members are stationarily connected to the shafts and include major trusses and minor trusses forming substantially X-shaped arrangements.

5. The bicycle mount of claim 1, wherein the bicycle mount defines a bicycle mount height that is related to a cavity depth of a cavity within a floor of a truck bed, and wherein the bicycle mount height is slightly greater than the cavity depth such that the bicycle mount maintains a bicycle substantially level to the floor of the truck bed.

6. The bicycle mount of claim 1, wherein the pins includes three sets of two pins, each set of the two pins extending substantially perpendicular from the surface of each cross-member, and wherein the mounting surface defines two holes corresponding to one set of two pins.

7. The bicycle mount of claim 1, wherein the mounting surface is a floor of a truck bed, and wherein the bicycle mount is mounted within the truck bed.

8. The bicycle mount of claim 1, wherein each pin defines a pin shaft and a pin head, wherein the surface defines a holes having a keyhole shape, the keyhole shape having a keyhole body and a keyhole slot, the keyhole body shaped to receive the pin head and the keyhole slot shaped to receive the pin shaft, wherein the bicycle mount is mounted to the surface by inserting the pin heads of one set of pins into the keyhole body and sliding the pin shaft into the keyhole slot, whereby the holes lock the bicycle mount to the surface by the pins.

9. The bicycle mount of claim 1, wherein each shaft length is less than a distance between two front forks of a bicycle mounted to the bicycle mount such that the bicycle mount fits within the two front forks when the bicycle is mounted to the bicycle mount by the front wheel axle.

10. A bicycle mounting system, comprising:
    a bicycle mount having shafts forming a spatial arrangement around a central bicycle mount axis, the shafts defining shaft axes, shaft lengths, and one or more bores extending axially along the shaft length, the one or more bores sized to receive a front wheel axle of a front wheel of a bicycle, such that when the front wheel axle is installed to one of the bores of one of the shafts, the bicycle is mounted to the one of the shafts when the front wheel is removed from the bicycle;
    cross-members located between the shafts and connecting the shafts in the spatial arrangement; and
    a surface of a vehicle that supports the bicycle mount via at least one of the shafts such that the at least one of the shafts rests substantially flush with the surface.

* * * * *